United States Patent [19]
Freneix

[11] Patent Number: 5,271,047
[45] Date of Patent: Dec. 14, 1993

[54] METHOD OF ACTING REMOTELY ON A NUCLEAR POWER STATION SITE

[75] Inventor: Gérard Freneix, Saint Sebastien, France

[73] Assignee: ACB, Paris, France

[21] Appl. No.: 921,201

[22] Filed: Jul. 29, 1992

[30] Foreign Application Priority Data

Aug. 1, 1991 [FR] France ................................ 91 09810

[51] Int. Cl.$^5$ ............................................. G21C 19/00
[52] U.S. Cl. ........................................ 376/260; 104/2; 246/8; 414/339
[58] Field of Search ................. 376/260, 245, 249; 246/3, 4, 8, 167 R; 104/2, 5; 414/339; 180/167, 168, 9.44; 343/770, 771, 772; 340/933

[56] References Cited

U.S. PATENT DOCUMENTS

| | | | |
|---|---|---|---|
| 3,781,687 | 12/1973 | Nakahara et al. | 246/8 |
| 4,542,697 | 9/1985 | Cicin-Sain | 104/2 |
| 4,720,067 | 1/1988 | Jaeger | 246/167 R |
| 4,932,617 | 6/1990 | Heddebaut et al. | 246/8 |

FOREIGN PATENT DOCUMENTS

| | | |
|---|---|---|
| 0274055 | 7/1988 | European Pat. Off. |
| 0275874 | 7/1988 | European Pat. Off. |
| 0355338 | 2/1990 | European Pat. Off. |
| 1461944 | 1/1977 | United Kingdom |

*Primary Examiner*—Daniel D. Wasil
*Attorney, Agent, or Firm*—Sughrue, Mion, Zinn, Macpeak & Seas

[57] ABSTRACT

The invention provides a method of acting remotely on a site, such as a damaged nuclear power station. It consists in placing lengths of waveguide end-to-end by means of at least one carriage which is remotely controlled by the line of waveguide lengths implemented in this way, the carriage being provided with handling equipment for laying purposes and with at least one robot arm for connecting the lengths of waveguide together under the control of a control station including a signal generator and a signal receiver, which line is laid to the site that is to be inspected and optionally treated.

7 Claims, 1 Drawing Sheet

METHOD OF ACTING REMOTELY ON A NUCLEAR POWER STATION SITE

The present invention relates to a method of acting remotely on a site, such as a damaged nuclear power station.

BACKGROUND OF THE INVENTION

French patent 2 608 119 describes a wideband system for locating purposes and for transmitting information and/or instructions between a mobile and a control station for said mobile, the system comprising a hollow tube parallel to the path followed by the mobile and forming a waveguide, the tube having an emitting face pierced by an array of openings for passing microwave electromagnetic radiation, the mobile being provided with at least one microwave transmit and/or receive antenna disposed facing the face of the tube which is pierced by the array of openings, the hollow tube being connected to at least one microwave feed member and to a member for receiving microwaves coming therefrom.

Such a system enables wideband analog information and/or high data rate digital information to be interchanged, e.g. telephone and/or video signals, and/or telemetry and/or remote control signals, and it also enables measurements to be made of the position and/or of the speed of the mobile moving close to the tube forming the microwave waveguide, which tube is referred to below as the "waveguide".

The present invention relates to a method of acting remotely on a site using such waveguides as a transmission and remote control system.

The use of robot vehicles controlled by radiowaves propagating freely is known. It suffers from problems of interference. So-called "tunnel" effects similar to those that occur with underground transmission may also prevent waves travelling from the transmitter to the receiver. In addition, screening may disturb the propagation of radiowaves.

These problems are solved by the method of the invention for acting remotely.

SUMMARY OF THE INVENTION

To do this, the method consists essentially in placing lengths of waveguide end to end by means of at least one carriage which is remotely controlled by the line of waveguides implemented in this way, the carriage being provided with handling equipment for laying purposes and with at least one robot arm for connecting the lengths of waveguide together under the control of a control station including a signal generator and a signal receiver, which line is laid to the site that is to be inspected and optionally treated.

BRIEF DESCRIPTION OF THE DRAWINGS

The invention is described below in detail with the aid of a drawing that shows merely a preferred implementation.

DETAILED DESCRIPTION

Figure 1:
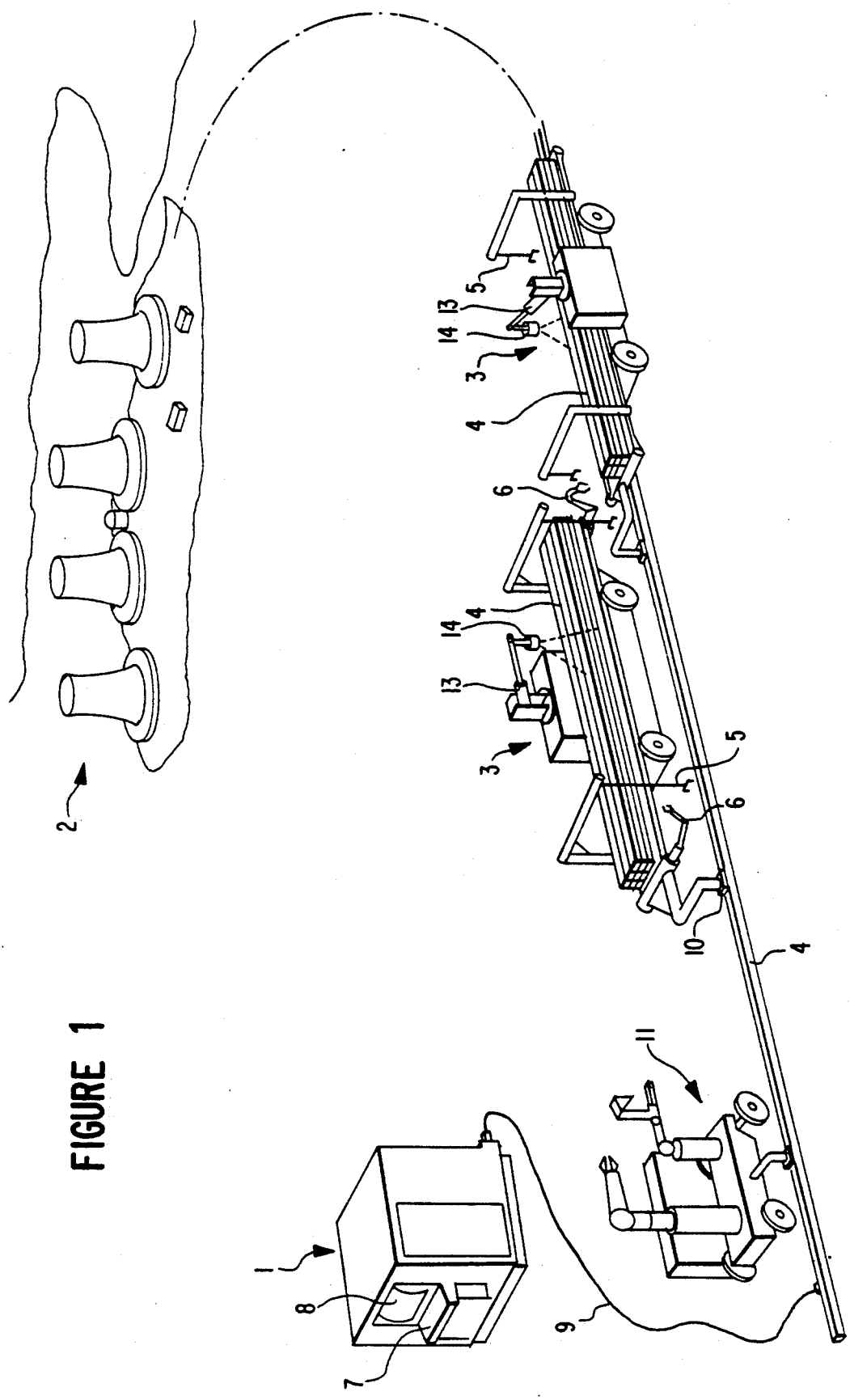

A control station 1 is installed at a certain distance from a site 2.

If the site is a damaged nuclear power station, the distance is determined as a function of the dangerous radiation risk, and the control station 1 is installed outside the perimeter defined in this way.

The control station 1 includes a microwave generator and a signal-receiving cabinet.

At least one moving carriage 3 is controlled from the station 1, the carriage including a microwave generator compartment and a transmit/receive antenna 10.

In addition, the carriage 3 includes a support device for supporting a certain number of lengths 4 of waveguide, handling equipment 5 for taking hold of a length 4 in the support device, for laying said length on the ground, and at least one robot arm 6 for connecting said length to the end of a length that has already been laid on the ground.

In addition, the carriage 3 includes an elevator arm 13 having a rotary television camera 14 installed thereon for locating and inspection purposes. A locating antenna may optionally be installed on the carriage to provide locating information complementary to that from the camera.

To control these items, the control station 1 includes control means 7 for controlling displacement of the carriage, for controlling the handling equipment 5, for controlling the robot arms 6, and for controlling the elevator arm, and it also includes a screen 8 for displaying the signals sent from the camera.

A first length 4 of waveguide is installed close to the control station and is connected thereto by a coaxial cable 9. The carriage 3 is installed close to said length, with its antenna 10 facing the openings for passing electromagnetic radiation.

The line of waveguides is then implemented by repeating the following cycle of operations:
 the carriage 3 is displaced along the last length to have been laid;
 the carriage 3 is stopped close to the end of said length; and
 the following length is laid and connected by using the handling equipment 5 and the robot arms 6.

This cycle is repeated until the site is reached.

In the event of the number of lengths loaded on the carriage being insufficient, then the cycle of operations is interrupted, the carriage 3 is brought back to the beginning of the line and is reloaded with a certain number of lengths 4, and it then returns to the end of the line as laid so far.

To increase the speed with which lengths of waveguide 4 are laid, two identical carriages 3 can be used as shown in the drawing, with one of the carriages acting from the right of the line and the other acting from the left.

Thus for example, a possible operation has one of the carriages 3 active, and when its store of lengths 4 has been used up, it is sent back to the beginning of the line to be reloaded, whereupon the other carriage becomes active and lays its lengths 4. The time required for reloading lengths 4 is thus not wasted.

Once on the site, inspection can be performed using the camera and the robot arm may be used or replaced with treatment tooling, if so required.

Once the line of waveguide has been installed, any type of vehicle suitable for remote control thereby can be used. The figure shows one example of such a robot vehicle 11 that can then be used.

To increase the area that is accessible from the line of waveguide lengths, mobile-carrying carriages can be used to transport mobile robots to a desired location. The mobiles are connected to the carriage by means of a coaxial cable and thus have a radius of action determined by the length of the cable.

In addition, the site (in particular a nuclear power station) may be fitted with pre-installed waveguides. If the waveguide installation is not damaged, then it can be connected to the control station under remote control by means of an appropriate carriage. Under such circumstances it suffices merely to connect it to the line as laid by means of a coaxial cable. If the installation is damaged in part, then those parts which are still serviceable can be connected and put into operation.

I claim:

1. A method of acting remotely on a nuclear power station site, said method comprising the steps of: placing lengths of waveguide end-to-end by means of at least one carriage and remotely controlling the carriage by a line of waveguide lengths defined by said end-to-end lengths of waveguide, said carriage being provided with handling equipment for laying said lengths of waveguide and with at least one robot arm, and said method further comprises connecting said lengths of waveguide together by said at least one robot arm under control of a control station which includes a signal generator and a signal receiver, whereby said line of waveguide lengths may be laid from said control station to the site to be inspected and optionally treated.

2. A method according to claim 1, wherein said at least one carriage is loaded with a certain number of lengths of waveguide and wherein the line of waveguide lengths is laid by repeating the following cycle of operations until the site is reached:

said at least one carriage is displaced along the last length to have been laid;

said at least one carriage is stopped close to the end of said length; and the next length is laid and connected.

3. A method according to claim 2, wherein the cycles of operations are interrupted when all of the lengths loaded on the carriage have been laid, said at least one carriage then being returned to the beginning of the line of waveguide lengths, being reloaded with a certain number of lengths, and then being returned to the end of the line that has already been implemented.

4. A method according to claim 1, wherein positioning and inspection are performed using a rotary television camera installed on an elevator arm on the carriage.

5. A method according to claim 1, wherein said at least one carriage comprises two carriages, and said method comprises controlling movement of said two carriages via said line of waveguide lengths.

6. A method according to claim 1, wherein once the line of waveguide lengths has been installed all the way to the site, treatment tooling is installed on the carriage.

7. A method according to claim 1, wherein said at least one carriage comprises multiple special robot carriages and said method further comprises remotely controlling said special robot carriages on the site using said line of waveguide lengths.

* * * * *